Nov. 29, 1927.
A. SCIMONELLI
1,651,001
SHOE TREE
Filed Oct. 22, 1926
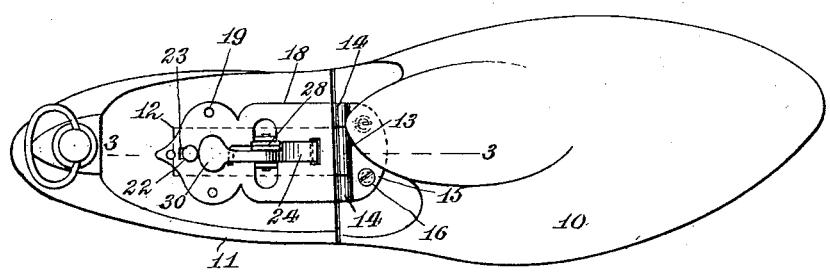
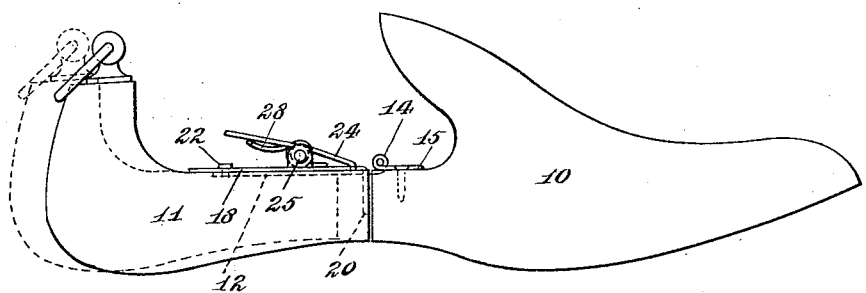
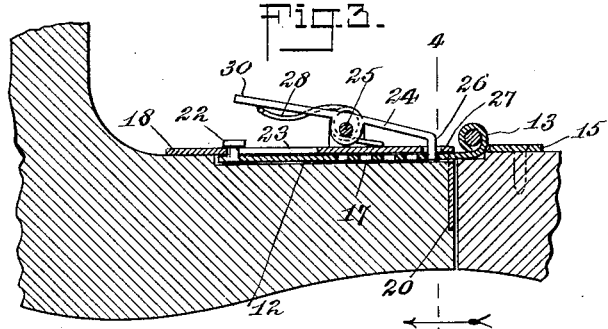
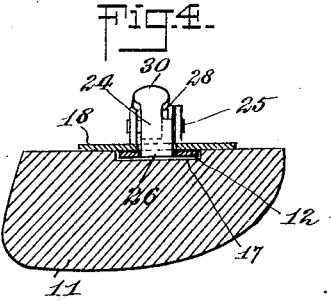
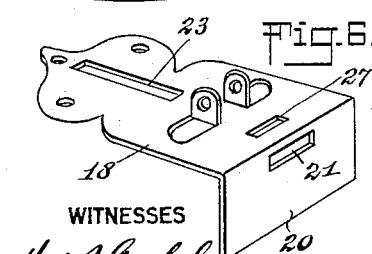
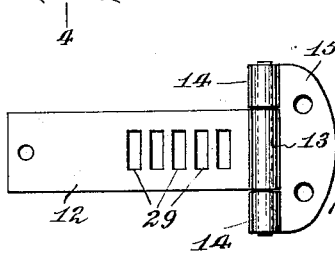
INVENTOR
ANTONIO SCIMONELLI
BY
ATTORNEY Patented Nov. 29, 1927.

1,651,001

UNITED STATES PATENT OFFICE.

ANTONIO SCIMONELLI, OF BROOKLYN, NEW YORK.

SHOE-TREE.

Application filed October 22, 1926. Serial No. 143,420.

This invention relates to shoe trees of the type which includes a pair of sections and comprehends an improved adjustable hinge connection between the sections to allow for a limited adjustment in the length of the tree whereby the same may be used in connection with shoes of varying sizes.

One of the principal objects of the invention is to provide an adjustable hinge connection which facilitates the operation of effecting adjustments and which insures a strong, durable and rigid connection between the sections.

The invention furthermore comprehends a shoe tree structure which is comparatively simple, economical to produce, and which is highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a plan view of the shoe tree constructed in accordance with the invention;

Fig. 2 is a side view thereof illustrating in full and dotted lines, two adjusted positions of the section;

Fig. 3 is a fragmentary longitudinal sectional view taken approximately on the line 3—3 of Fig. 1;

Fig. 4 is a transverse sectional view taken approximately on the line 4—4 of Fig. 3;

Fig. 5 is a plan view of the shank element detached from the tree, and

Fig. 6 is a perspective view of the cover plate removed from the rear tree section.

Referring to the drawings by characters of reference, 10 and 11 designate respectively the front and rear sections of the tree. In order to hingedly and adjustably connect the sections to respectively permit of the insertion of the tree within or the removal of the same from a shoe and to allow for limited longitudinal adjustment in the length of the tree, a shank 12 is provided, which is of substantially rectangular cross-sectional configuration, the same being provided at one extremity with a hinge knuckle 13 positioned between spaced hinge knuckles 14 on a leaf 15, which is adapted to be attached to the front section 10 by screws or other fastening elements 16 so that the shank is hingedly carried by the front section. The rear section is provided with a recess or groove 17 in its upper face extending from its forward end to a point rearwardly, said groove being of an appropriate size to snugly receive the shank 12. The groove is covered by a plate 18 overlying the upper surface of the rear section and attached thereto by screws or other fastening elements 19. The plate 18 is formed with a depending wall 20 at its forward end overlying the front wall of the rear section 11 and provided with a rectangular receiving slot 21 in alinement with the groove, which slot is of a size to snugly receive the shank 12. The shank is connected with a plate for limited sliding movement by a stud or rivet 22 formed on the shank and engaged in a longitudinal slot 23 in the plate. In order to retain the shank and the front section in relatively adjusted relation to the rear section 11, a latch 24 is pivoted at 25 to the plate and its bill or nose 26 is normally projected through an aperture 27 in the plate by a spring 28 so that the bill or nose is projected into one of the longitudinally spaced keeper openings 29 formed in the shank 12. The latch is provided with a manipulating terminal 30 which when depressed against the action of the spring 28, swings the nose or bill 26 to a retracted position from the keeper openings 29 to allow for sliding movements of the shank with respect to the plate 18 and the rear section 11.

In use the tree is adjusted to coincide with the length of the shoe with which it is to be used by depressing the manipulating terminal 30 and adjusting the sections 10 and 11 with respect to each other, after which the nose 26 is engaged in the proper keeper opening. By swinging the section 11 upwardly at an angle, the front section 10 is inserted into the forward portion of the shoe, after which the rear section 11 is swung downwardly to engage in the rear or heel portion of the shoe.

What is claimed is:

1. In a shoe tree, including a pair of sections, an adjustable hinge connection therebetween, comprising a shank member having hinge connection with one section and limited slidable connection with the other section, and means for retaining the shank and latter section in shifted relation, said means consisting of a portion of the shank having a series of keeper openings and a spring-pressed latch on said latter section selectively engaged in said keeper openings.

2. In a shoe tree, including front and rear sections, an adjustable hinged connection therebetween comprising a shank hinged to the forward section, the rear section having a grooved portion in its upper face, a plate overlying the grooved portion of said rear section and defining together therewith, a tunnel within which the shank is snugly arranged, a pin-and-slot connection between the shank and the plate establishing a limited sliding connection between the sections, said shank having a plurality of longitudinally spaced keeper openings, and a spring pressed latch mounted on the plate and selectively engaged with the keeper openings.

ANTONIO SCIMONELLI.